(12) United States Patent
Selvarajan et al.

(10) Patent No.: US 11,017,297 B2
(45) Date of Patent: May 25, 2021

(54) SYSTEM AND METHODS TO PROVIDE SEAMLESS INFORMATION EXCHANGE BETWEEN CERTIFIED AND UNCERTIFIED APPLICATIONS

(71) Applicant: Honeywell International Inc., Morris Plains, NJ (US)

(72) Inventors: Ravikumar Selvarajan, Bangalore (IN); Partho Sarkar, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 981 days.

(21) Appl. No.: 15/620,319

(22) Filed: Jun. 12, 2017

(65) Prior Publication Data
US 2018/0357561 A1    Dec. 13, 2018

(51) Int. Cl.
*H04L 29/08* (2006.01)
*H04L 12/66* (2006.01)
(Continued)

(52) U.S. Cl.
CPC .......... *G06N 5/022* (2013.01); *G05D 1/0055* (2013.01); *G06F 9/541* (2013.01); *G06F 16/22* (2019.01);
(Continued)

(58) Field of Classification Search
None
See application file for complete search history.

(56) References Cited

U.S. PATENT DOCUMENTS 7,975,025 B1 * 7/2011 Szabo .................. G06F 16/9574
709/218
9,092,611 B1    7/2015 Heinrich
(Continued)

FOREIGN PATENT DOCUMENTS

EP    3101536    12/2016

OTHER PUBLICATIONS

Saini, Kulbir. Squid Proxy Server 3.1: beginner's guide. Packt Publishing Ltd, 2011. (Year: 2011).*
(Continued)

*Primary Examiner* — Luis A Sitiriche
*Assistant Examiner* — Casey R. Garner
(74) *Attorney, Agent, or Firm* — Bookoff McAndrews, PLLC

(57) ABSTRACT

A system for information exchange comprises a vehicle electronics data broker gateway for exchanging information between vehicle electronics certified applications and uncertified applications. The data broker gateway comprises configuration files generated with a dedicated modeling tool; a source selection module operative to seamlessly choose a best data source; a source abstraction and data collection module operative to receive data from the data source; a data conversion module operative to convert the data received into a standard format; a data cache operative to store the data received before transmitting the data; and a client abstraction and data dispatch module operative to transmit the data to the client. The data broker gateway also includes a data pre-fetch module comprising a rule based engine operative to determine a time to pre-fetch data based on pre-defined rules; and a machine learning based engine operative to learn data fetching conditions for a given data source.

17 Claims, 10 Drawing Sheets

(51) Int. Cl.
*G06N 20/00* (2019.01)
*G05D 1/00* (2006.01)
*G06N 5/02* (2006.01)
*G06F 9/54* (2006.01)
*G06N 5/04* (2006.01)
*G06F 16/22* (2019.01)
*G06F 16/23* (2019.01)

(52) U.S. Cl.
CPC .......... *G06F 16/2379* (2019.01); *G06N 5/04* (2013.01); *G06N 20/00* (2019.01); *H04L 12/66* (2013.01); *H04L 67/2823* (2013.01); *H04L 67/2847* (2013.01)

(56) References Cited

U.S. PATENT DOCUMENTS

| | | | |
|---|---|---|---|
| 9,141,830 B2 | 9/2015 | Uczekaj et al. | |
| 9,189,655 B2 | 11/2015 | Uczekaj et al. | |
| 9,284,045 B1* | 3/2016 | Springer | B64D 43/00 |
| 9,529,356 B2 | 12/2016 | Mere et al. | |
| 2013/0104251 A1* | 4/2013 | Moore | G06F 21/602 |
| | | | 726/30 |
| 2014/0075506 A1* | 3/2014 | Davis | H04L 63/0209 |
| | | | 726/3 |
| 2014/0282470 A1* | 9/2014 | Buga | G06F 8/65 |
| | | | 717/170 |
| 2016/0219110 A1 | 7/2016 | Uczekaj et al. | |

OTHER PUBLICATIONS

"Aspen Avionics Announces Connected Panel", Jul. 26, 2011, Publisher: Aspen Avionics, Inc.
Rockwell Collins, "Secure Server Router (SSR-7000) Electronic Flight Bag Interface and Communication Unit (EICU)", pp. 1-3.

* cited by examiner

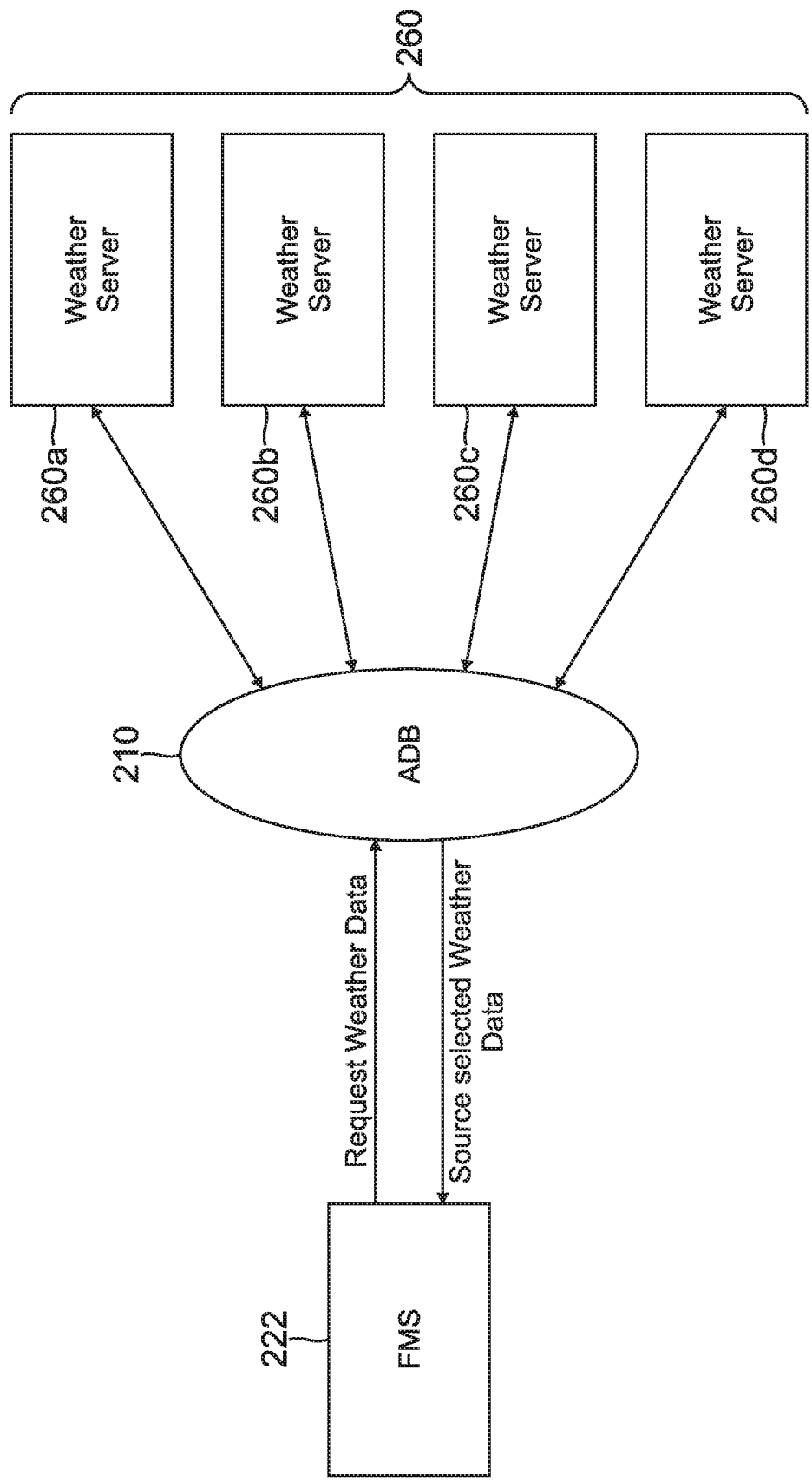

SYSTEM AND METHODS TO PROVIDE SEAMLESS INFORMATION EXCHANGE BETWEEN CERTIFIED AND UNCERTIFIED APPLICATIONS

BACKGROUND

The transportation industry is going through a large transformation due to the advent of data connectivity and the mobile applications that come with such connectivity. For example, in the aviation industry, a huge number of uncertified devices and applications are being created that can provide a lot of useful services. These uncertified applications include everything that work outside of a vehicle electronics bus such as an avionics bus, including on ground servers, cloud/web servers, external storage devices, data from air traffic control (ATC) or an airline operations center (AOC), data from other aircrafts, carry-on devices of crew or passengers onboard, electronic flight bag (EFB) applications, and the like.

Some of these uncertified applications make use of real time data (e.g., both in-air and on ground) available from industry certified vehicle electronics applications. Other uncertified applications provide real time information from the external world to the certified applications to make some important decisions or computations. Interactions between uncertified and certified applications can be one-way (uncertified to certified or the other way), or both ways (uncertified to and from certified). Interactions between uncertified and certified applications can also be either automatic/software triggered or human user initiated, and can be either client initiated (pull) or server initiated (push). The server and client can be either the certified or the uncertified application—depending on who is in need of the data and who is providing the data.

The number of uncertified applications being developed is rapidly growing and in the near future, both certified and uncertified applications will work seamlessly together. Due to several benefits that the uncertified applications offer (e.g., inexpensive development cost, quick to develop and deploy, more sophisticated features, greater resources like MIPS architecture, memory, processing speed) and also due to increasing robust connectivity between certified applications and uncertified applications, a lot of non-safety critical functionalities are increasingly developed as uncertified applications (e.g., flight planning applications) rather than getting developed as certified applications.

As more and more certified and uncertified applications start seamlessly working together, various improvements are needed to solve the technical challenges of the future. For example, data source abstraction is needed so that there are no dependencies between applications. One-on-one interdependencies pose maintenance problems and hinder future growth, which is especially true when relying on uncertified applications, whose support may not be guaranteed for the full life cycle. In addition, seamless and transparent access to redundant data sources or servers for given data is also needed. The server applications might face availability issues, as such applications may go down during operations (especially true with uncertified applications). While client applications need to take advantage of redundant server sources that are available, managing multiple sources is a complex task.

Other needed improvements include efficient client request management, minimal server interactions, and minimal data traffic flow. If all of the client applications start directly interacting with the server applications, it not only impacts the bus traffic, but also the performance of the server and client application on either side of the bus, which is more pronounced on certified real-time applications. In addition, a firewall between certified and uncertified applications is needed. A common format of data transactions avoiding variation management for clients is also needed. Variations in the content and the format of the data from server applications will force the client applications to manage the variations to deal with different server applications. Further, effective ways to reduce the latencies of acquiring the data from servers is needed. The data transfer to and from the uncertified applications involves several slow speed elements that can cause high latency delays and the fetched data might even turn stale.

SUMMARY

A system for information exchange comprises a vehicle electronics data broker gateway operative to exchange information between one or more vehicle electronics certified applications and one or more uncertified applications through one or more application programming interfaces. The data broker gateway comprises one or more configuration files, which are generated with a dedicated modeling tool based on user requirements; a source selection module operative to seamlessly choose a best data source amongst a plurality of data sources based on one or more criterions; a source abstraction and data collection module operative to receive data from the data source, either based on pull from a client or push from the data source, wherein the data source comprises one of the vehicle electronics certified applications or one of the uncertified applications; a data conversion module operative to convert the data received from the data source into a standard format supported by the one or more application programming interfaces; at least one data cache operative to store the data received from the data source before transmitting the data to the client; and a client abstraction and data dispatch module operative to transmit the data to the client, either based on push from the data source or pull from the client, wherein the client comprises one of the vehicle electronics certified applications or one of the uncertified applications. The data broker gateway also includes a data pre-fetch module comprising a rule based engine operative to determine a time to pre-fetch data based on one or more pre-defined rules; and a machine learning based engine that is operative to learn data fetching conditions for a given data source, and then use the learning to determine a time to pre-fetch a given data from the given data source.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 2B is a block diagram depicting an exemplary operation for an avionics data broker gateway in the system of FIG. 2A;

DETAILED DESCRIPTION

Figure 1A:
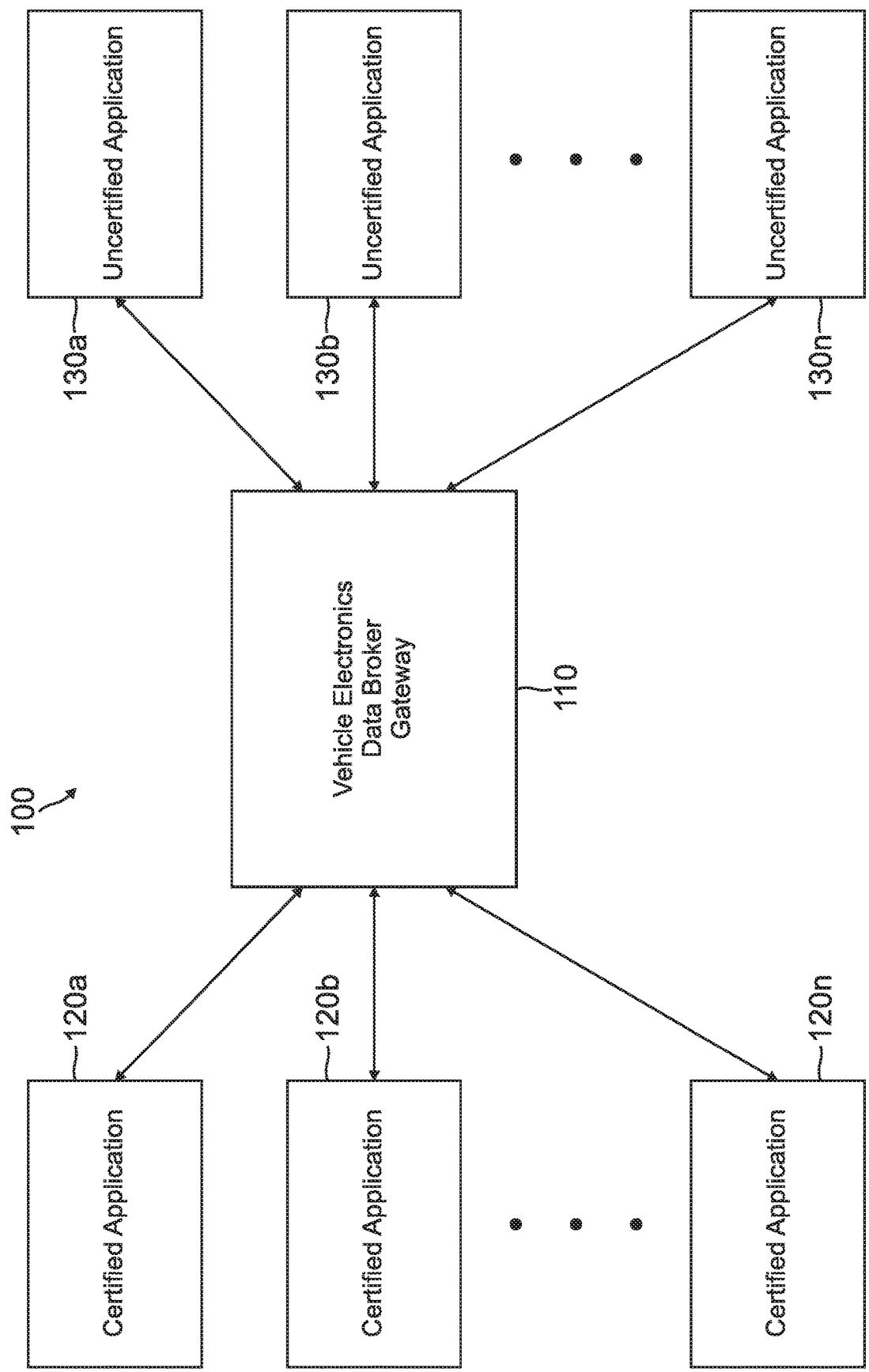
FIG. 1A is a block diagram of a system for information exchange between certified and uncertified applications, which employs a vehicle electronics data broker gateway.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A system and method to regulate the exchange of information between certified and uncertified vehicle electronics applications are disclosed. The system and method provide server and data abstraction, efficiency, robustness and proactiveness to the data transfers, thereby providing a one-stop solution for all data exchange needs.

The system includes an intelligent gateway component, referred to herein as a vehicle electronics data broker gateway, or avionics data broker (ADB) gateway for aviation applications. The data broker gateway can be implemented as a space and time separated software partition, with access to both certified and uncertified applications. The data broker gateway provides for efficient and regulated information flow between industry certified applications and uncertified applications, allowing the certified and uncertified applications to seamlessly share information.

As used herein, the terms "certified" and "uncertified" refer to whatever the related regulatory authority deems certified or uncertified based on the relevant industry. For example, aircraft can use applications that meet Federal Aviation Administration (FAA) or European Aviation Safety Agency (EASA) certification standards; ground vehicles and passenger ships can use applications that meet certification standards from appropriate regulatory agencies.

The vehicle electronics data broker gateway provides for data source redundancy, in that more than one source can be made available for any given data for the client, and the source can be selected based on customer preferred criterion. In the absence of a preferred server, the next preferred server is automatically chosen based on that criterion, but the selection is transparent to the client. This increases the availability of the data.

The data broker gateway can also offer services to proactively determine when clients may need data, and can pre-fetch the data from the servers, thereby greatly decreasing the latency for serving client requests. This can be done via a customized rule engine or via machine learning. The data broker gateway can also provide recommended and ratified sources, and their priorities, while also allowing users to add new data sources.

The data broker gateway can efficiently handle requests coming from multiple client applications for a single data by caching the server data and sending the cached (and still fresh) data. This greatly reduces the interrupts to the server applications, reducing bus traffic and the latencies involved.

The data broker gateway can be configured to reside either as a certified application or an uncertified application, but still maintain the same interfaces with the server and client applications, based on the system needs. The data broker gateway also acts as a firewall between the certified and uncertified applications.

Further details of the present system and methods are described hereafter with reference to the drawings.

FIG. 1A is a block diagram of a system 100 for information exchange between certified and uncertified applications. The system 100 includes a vehicle electronics data broker gateway 110, which is operative to exchange information between a plurality of vehicle electronics certified applications 120a, 120b, . . . 120n, and a plurality of uncertified applications 130a, 130b, . . . 130n, such as through one or more application programming interfaces (APIs). The data broker gateway 110 can be implemented either as a certified application, or as an uncertified application (for example, as an electronic flight bag (EFB) application (App) in an aviation environment, or as a mobile App in an automotive environment).

Depending on the flow of information exchange, certified applications 120a, 120b, . . . 120n can act as clients by requesting data, through data broker gateway 110, from uncertified applications 130a, 130b, . . . 130n, which act as data source servers. Likewise, uncertified applications 130a, 130b, . . . 130n can act as clients by requesting data, through data broker gateway 110, from certified applications 120a, 120b, . . . 120n, which in this scenario act as data source servers.

Figure 1B:
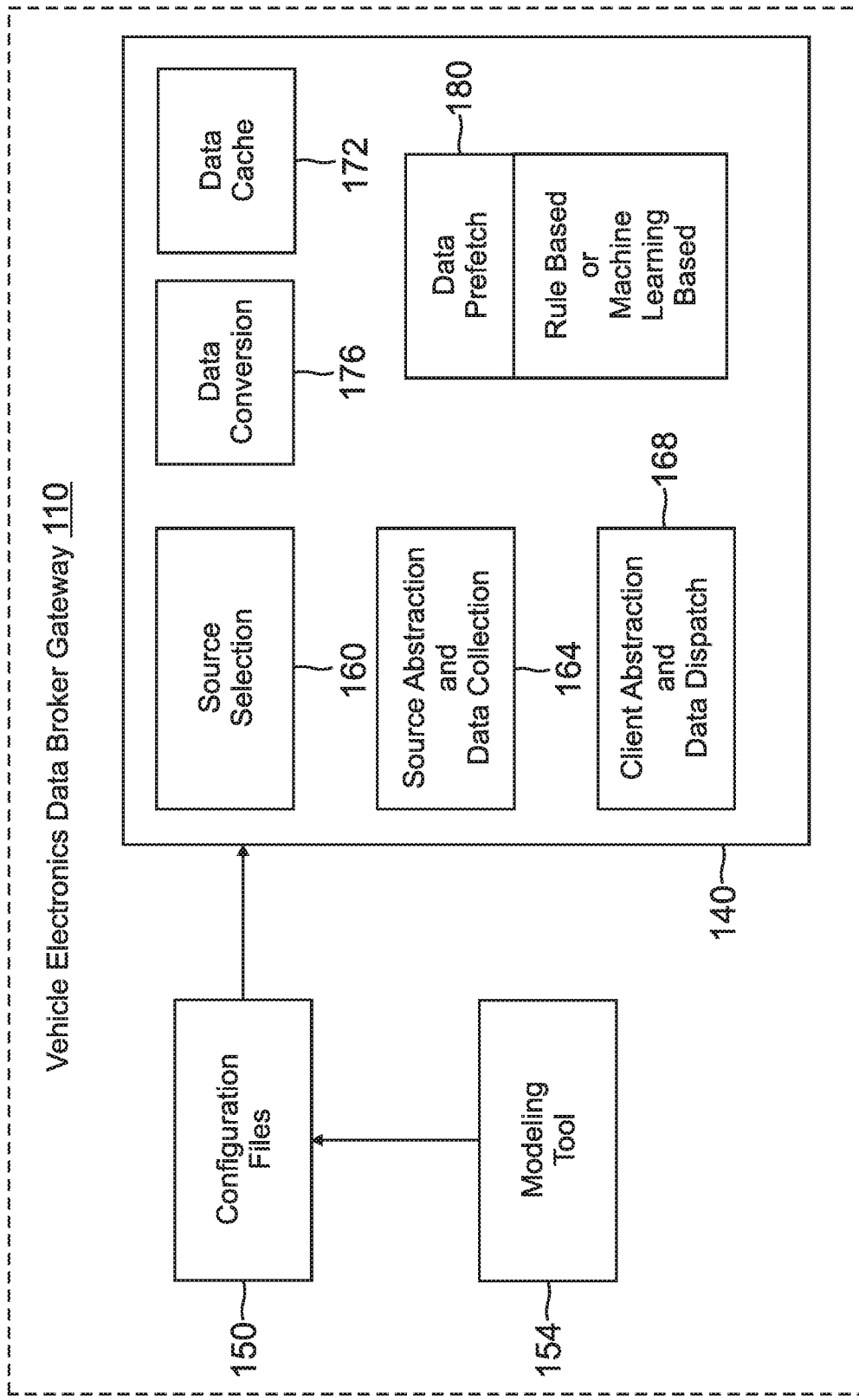
FIG. 1B is a block diagram depicting further details of implementing the vehicle electronics data broker gateway in the system of FIG. 1A.

FIG. 1B is a block diagram depicting further details of implementing vehicle electronics data broker gateway 110. As shown, data broker gateway 110 generally comprises a data broker unit 140, which includes various components described hereafter, and one or more configuration files 150 that are in operative communication with data broker unit 140. The configuration files 150 can be generated with a dedicated modeling tool 154 based on user requirements, as described in further detail hereafter. The configuration files 150 can contain a variety of information, such as identification of clients and servers; types of data to be collected and under what conditions; rate of data collection and transmission; alternate sources for a given data and order of data source selection; whether or not to predict client data needs and to proactively pre-fetch data; and ratification of data sources.

The data broker unit 140 includes a source selection module 160 that is operative to seamlessly choose a best data source amongst available data sources based on various criterions provided by configuration files 150. A source abstraction and data collection module 164 is operative to receive data, either based on pull from a client or push from a data source, either of which can be certified applications 120a, 120b, . . . 120n or uncertified applications 130a, 130b, . . . 130n (FIG. 1A). A client abstraction and data dispatch module 168 is operative to transmit the data to the client, either based on push from the data source or pull from the client, either of which can be certified applications 120a, 120b, . . . 120n or uncertified applications 130a, 130b, . . . 130n.

As shown in FIG. 1B, data broker unit 140 also includes at least one data cache 172, which is operative to store the data received from the data source before transmitting the data to the client. A data conversion module 176 is operative to convert data fetched from the data source into a standard format supported by the APIs. A data pre-fetch module 180 is also provided, and includes a rule based engine operative to determine a time to pre-fetch data based on one or more pre-defined rules. The data pre-fetch module 180 also includes a machine learning based engine that is operative to learn data fetching conditions for a given data source, and then use the learning to determine a time to pre-fetch a given data from the given data source.

Figure 2A:
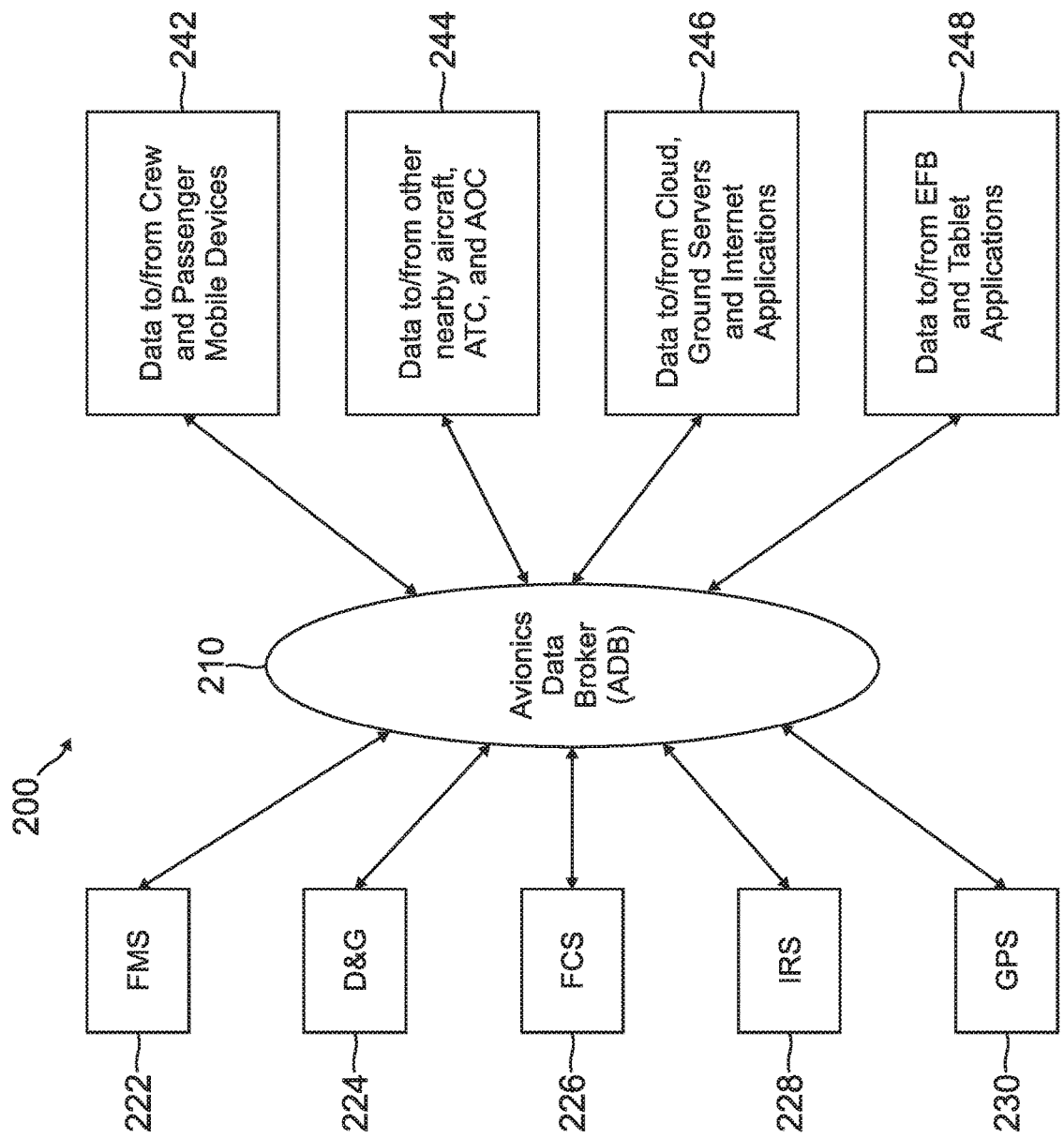
FIG. 2A is a block diagram of a system for information exchange between certified and uncertified applications, which can be implemented in an aviation environment.

FIG. 2A is a block diagram of a system 200 for information exchange between certified and uncertified applications, which can be implemented in an aviation environment. The system 200 includes an avionics data broker (ADB) gateway 210, which is operative to exchange information between multiple aviation certified applications and uncertified applications. The ADB gateway 210 can be implemented either as a certified application such as on a flight deck of an aircraft, or as an uncertified application.

The certified applications are hosted on various onboard avionics units, such as a flight management system (FMS) 222, a graphical display system (D&G) 224, a flight control system (FCS) 226, an inertial reference system (IRS) 228, and a global positioning system (GPS) receiver 230, for example. The uncertified applications are hosted by various data sources/clients, such as crew and passenger mobile devices (block 242); other aircraft nearby, air traffic control (ATC), and airline operations center (AOC) (block 244); the cloud, ground servers, and the Internet (block 246); an EFB and other tablet applications (block 248). The ADB gateway 210 allows data to be seamlessly passed from one or more of the avionics units to one or more of the uncertified data sources, or vice versa.

The ADB gateway 210 allows the certified applications to pull data from the uncertified applications and vice versa, which can be either human triggered (e.g., a pilot signaling an EFB to fetch data from the FMS) or software triggered (e.g., the FMS requesting weather data from a weather server during performance predictions). The ADB gateway 210 also allows the certified applications to push data to the uncertified applications and vice versa, which can be either human triggered (e.g., the pilot signaling the EFB to push the weather data to the FMS) or software triggered (e.g., the FMS pushing the flight plan data to the EFB for a change in the flight plan).

FIG. 2B depicts an exemplary operation for ADB gateway 210, showing data source abstraction from different weather data sources 260, and how avionics data broker 210 provides source redundancy. The FMS 222 sends a request for weather data to ADB gateway 210, which is in operative communication with weather data sources 260, such as various commercial weather servers 260a-260d. The ADB gateway 210 selects one of the weather servers 260a-260d from which to obtain the weather data, and sends the source selected weather data back to FMS 222. The FMS 222 does not know from which weather server the weather data comes from. If the selected weather server fails, ADB gateway 210 seamlessly switches over to another weather server to obtain the weather data.

Similarly, if an uncertified application needs the current fuel flow in an aircraft, the uncertified application need not know where the data is coming from. The ADB gateway might take the data from the FMS, but if the data is not valid, the ADB gateway might obtain the data from a full authority digital engine control (FADEC).

Figure 3:
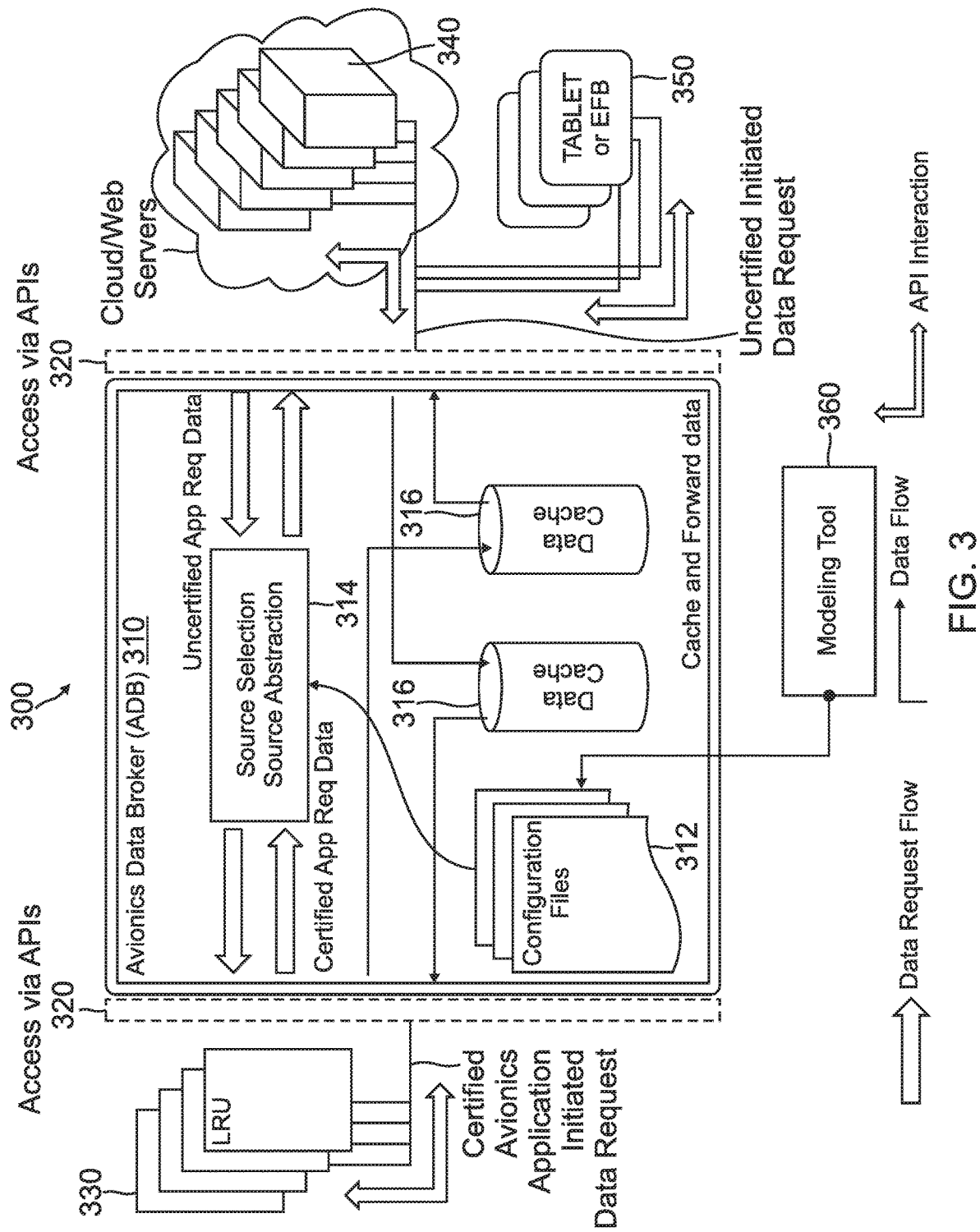
FIG. 3 illustrates an exemplary architecture of a system for information exchange between certified and uncertified applications, which can be implemented in an aviation environment.

FIG. 3 illustrates an exemplary architecture for a system 300 for information exchange between certified and uncertified applications, which can be implemented in an aviation environment. The system 300 generally includes an avionics data broker (ADB) gateway 310 operative to exchange information between avionics certified applications and uncertified applications via access through APIs 320. The certified applications can reside in one or more avionics line replaceable units (LRUs) 330, or equivalent hardware modules hosting avionics software functions onboard an aircraft. For example, onboard safety critical certified avionics applications can reside in LRUs 330. The uncertified applications can reside in one or more cloud/web servers 340; one or more mobile devices 350 such as tablet computers, smart phones, EFBs, portable electronic devices (PEDs), or the like; or other available data sources/clients. FIG. 3 also shows the direction of the data request flow, the data flow, and API interaction.

The ADB gateway 310 includes one or more configuration files 312, which can be generated with a dedicated modeling tool 360 based on user requirements. The modeling tool 360 can provide data modeling, source selection criteria, rules to pre-fetch data, data to be pre-fetched using machine learning, or data cache needs, for example.

The ADB gateway 310 also includes a source selection and abstraction unit 314, which is operative to receive information from configuration files 312. The source selection and abstraction unit 314 manages both the certified application requests for data and the uncertified application requests for data. The ADB gateway 310 also includes data caches 316 operative to store requested data received from the data sources before forwarding the requested data.

Further operational details of the vehicle electronics data broker gateway such as the ADB gateway are described as follows.

Configuration Files

The data broker gateway operational behavior is determined by the configuration files. The following are some of the information that can be captured in the configuration files: who are the clients and servers, as there can be one to many servers and clients for the same data; what data has to be collected and under what conditions; what rate the data has to be collected or transmitted; what are the alternate sources for a given data and what is the order of source selection; whether or not to predict the client's data needs and to proactively pre-fetch the data; if needed, whether to engage machine learning engine or rule-based engine; and if rule-based engine is engaged, what rules needs to be applied.

The configuration file can be a separately loadable item with a dedicated part number. This file can be read by the data broker gateway during its power up and used to configure itself. Apart from this, the configuration settings can be altered during steady state, as well as dynamically, via user requests.

Figure 4:
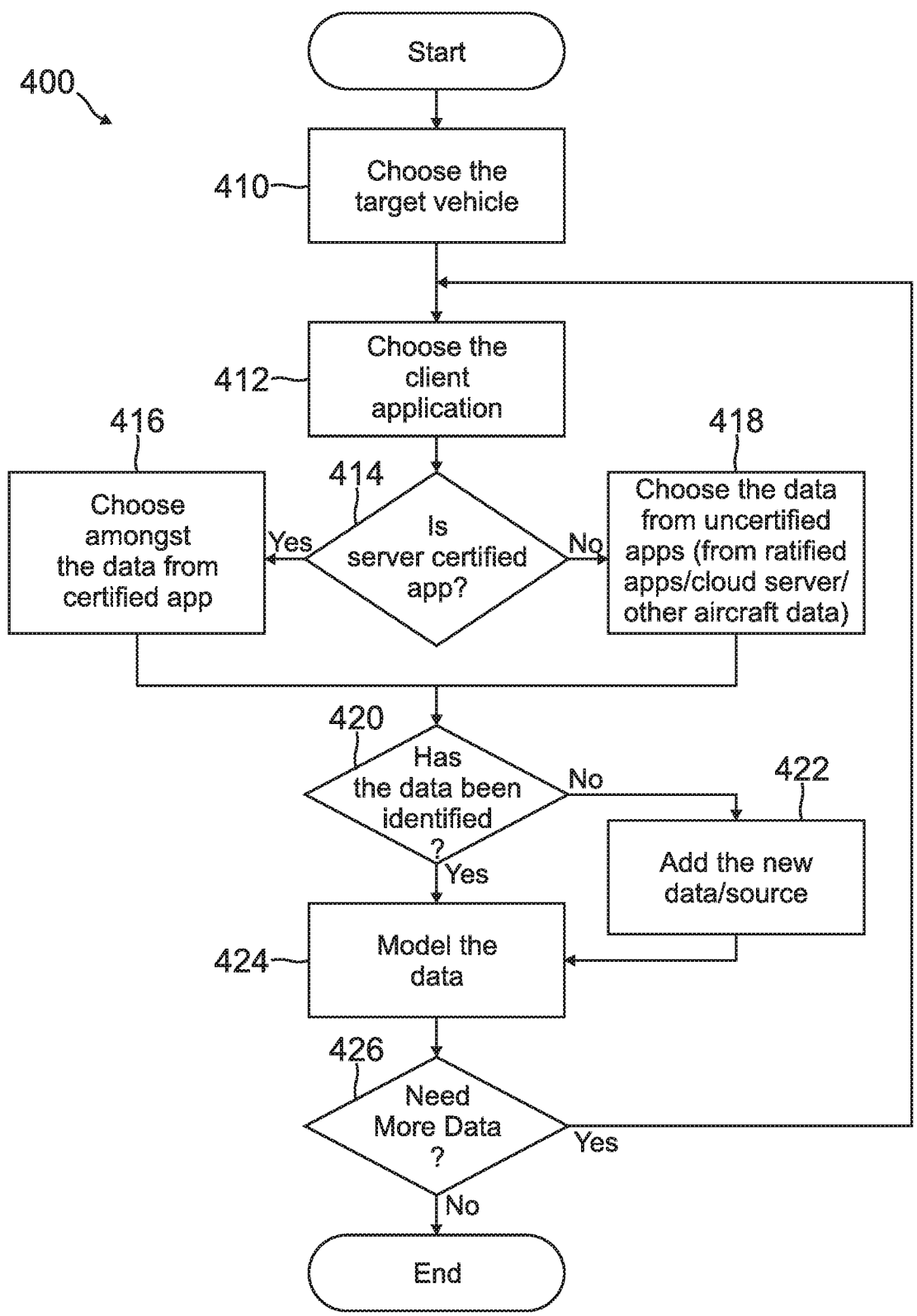
FIG. 4 is an algorithm flowchart of the operations in a method of modeling configuration file settings for a data broker gateway by using a modeling tool.

FIG. 4 is an algorithm flowchart showing the operations involved in a method 400 of modeling the configuration file settings for the data broker gateway by using the modeling tool. At the start of method 400, the user chooses the type and make of the target vehicle (block 410), and also chooses the client application (block 412). A determination is then made whether the server is a certified application (block 414). If yes, the user chooses amongst the data from the certified application (block 416). If the server is not a certified application, the user chooses the data from uncertified applications, such as from ratified applications, cloud servers, or other data such as aircraft data (block 418). A determination is then made whether the data been identified (block 420). If not, method 400 adds the new data/source (block 422), and then models the data (block 424). If the data has been identified, then method 400 directly models the data (block 424). A determination is then made whether there is a need for more data (block 426). If yes, the method returns to block 412, where the client application is chosen again, and the foregoing steps are repeated. If more data is not needed, method 400 comes to an end.

Figure 5:
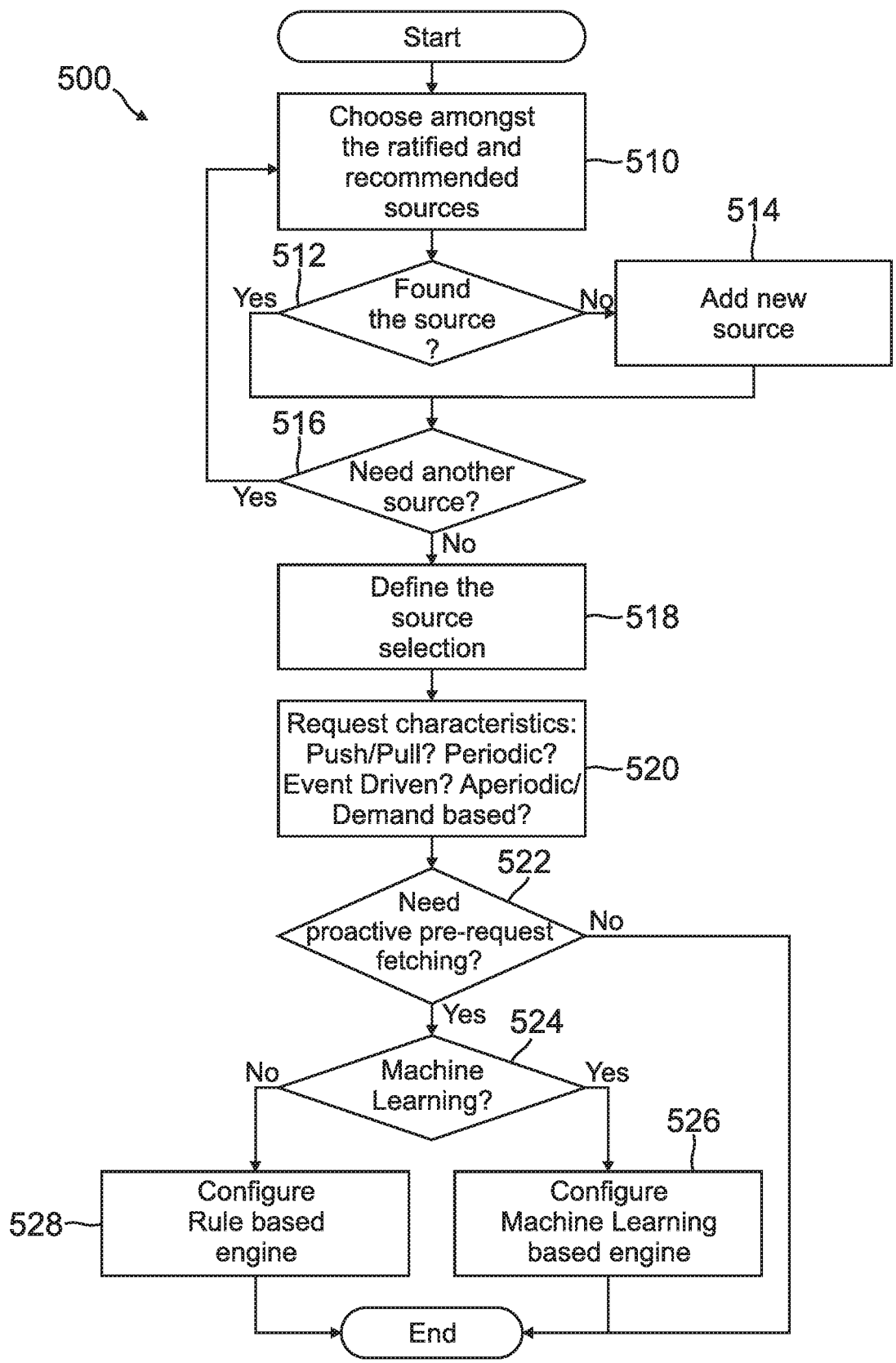
FIG. 5 is an algorithm flowchart of the operations in a method of modeling each of the individual data that are added to the configuration file for the data broker gateway by using the modeling tool.

FIG. 5 is an algorithm flowchart showing the steps involved in a method 500 for modeling each of the individual data that are added to the configuration file. At the start of method 500, the user chooses amongst the ratified and recommended sources (block 510). A determination is then made whether the source is found (block 512). If not, a new source is added (block 514), and a determination is made whether another source is needed (block 516). If the source is found (block 512), method 500 goes directly to block 516 to determine if another source is needed. If yes, method 500 returns to block 510 and the foregoing steps are repeated. If another source is not needed, method 500 defines the source selection (block 518), and requests data characteristics, such as push/pull, periodic, event driven, aperiodic/demand based (block 520). A determination is then made whether there is a need for proactive pre-request fetching (block 522). If not, method 500 comes to an end. If there is a need for proactive pre-request fetching, a determination is made whether machine learning is needed (block 524). If yes, method 500 configures a machine learning based engine (block 526) and then comes to an end. If machine learning is not needed, method 500 configures a rule based engine (block 528) and then comes to an end.

APIs: Data Abstraction

The data broker gateway provides APIs, which allows the servers and clients to perform the following functions: establish connection with the data broker gateway; request for data transfer—either push from server or pull to client; modify the configuration settings; and publish various events. The data broker gateway eliminates any interdependencies between the servers and the clients via the APIs and standardizing formats of data interactions. This allows mutual growth without any impact between the servers and clients.

For example, the data broker gateway might be getting raw data from the servers in its native format, but the data broker gateway can convert the raw data to a standard format corresponding to a particular API. In this way, the data broker gateway reduces the burden on the servers of the formatting responsibilities and the burden on the clients to handle native format variations. This effectively removes the need of any direct dependencies between the client and server applications.

Source Abstraction and Source Selection

Sometimes during operation, a preferred source may not be available or its data may not be valid. In this scenario, the data broker gateway can switch the sources of the data without any noticeable impact to the client.

Figure 6:
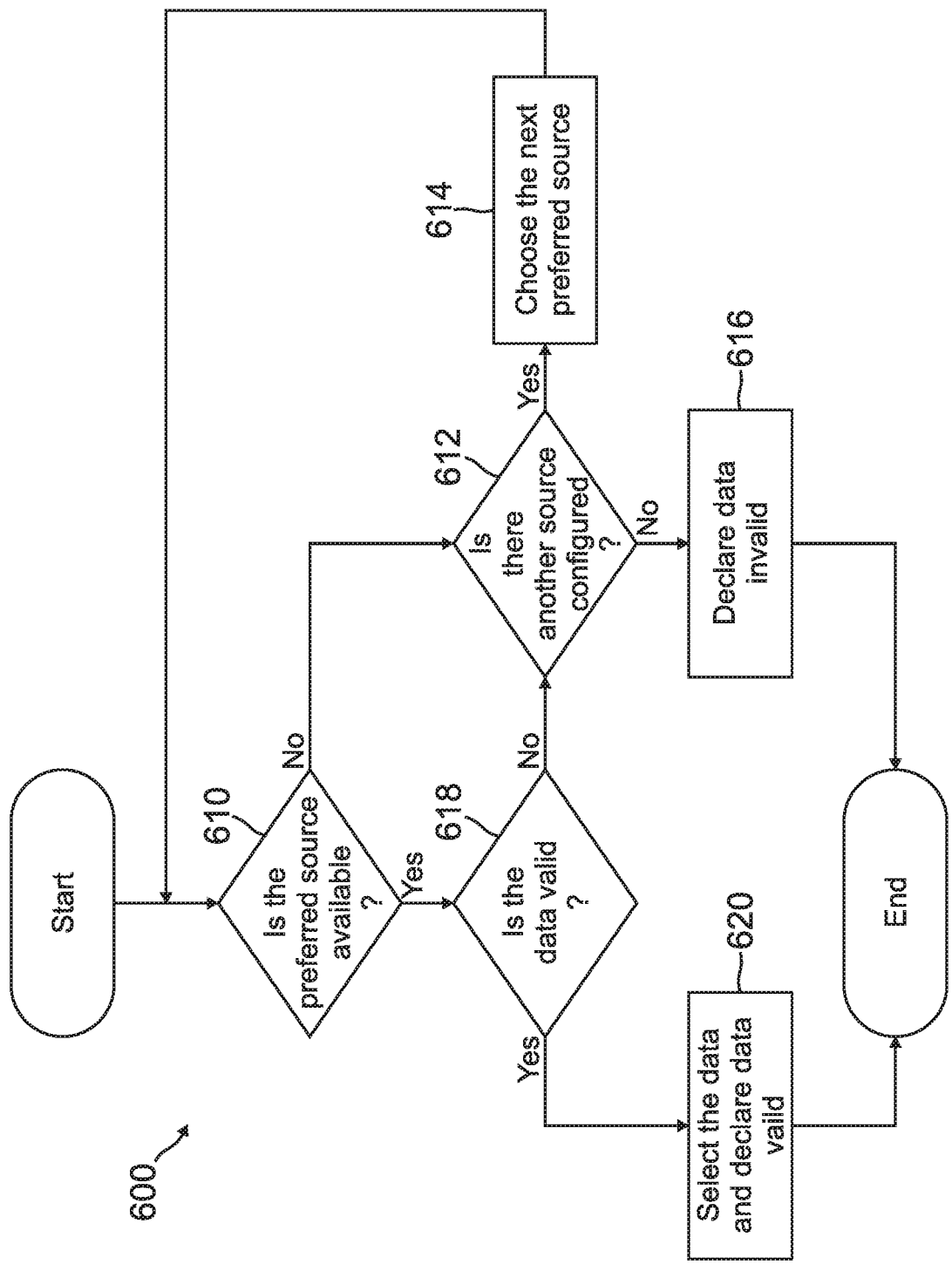
FIG. 6 is an algorithm flowchart of the operations in a method of source data selection for the data broker gateway, according to one approach.

FIG. 6 is an algorithm flowchart showing the steps involved in a method 600 for source data selection, according to one approach. At the start of method 600, a determination is made whether the preferred source is available (block 610). If not, a determination is made whether another source is configured (block 612). If yes, method 600 chooses the next preferred source (block 614), and repeats starting at block 610. If another source is not configured (block 612), method 600 declares the data invalid (block 616), and comes to an end.

Returning to block 610, if the preferred source is available, then a determination is made whether the data is valid (block 618). If not, a determination is made whether another source is configured (block 612). If yes, method 600 chooses the next preferred source (block 614), and repeats starting at block 610. If another source is not configured (block 612), method 600 declares the data invalid (block 616), and comes to an end. Returning to block 618, if the data is valid, method 600 selects the data and declares the data valid (block 620). The method 600 then comes to an end.

Efficient Client Request Handling

The data broker gateway can temporarily store the data that is being sent to a client in the data cache. If the same data gets requested by a different client, and if the data is fresh enough, the data broker gateway can send the same data to this new client as well. This reduces the traffic in the bus, reduces the interrupt to the server, and reduces the latency time as well. If the data is not fresh, the data broker gateway can fetch a fresh data set from the server.

Predictive Data Fetching

The data broker gateway can provide a mechanism for users via the modeling tool to define the rules for determining whether the client may need a particular data much ahead of time. Then, using the rule based engine, the data broker gateway can predict the client's data needs ahead of time and can pro-actively fetch the data and keep it ready.

The data broker gateway can also provide a mechanism for users via the modeling tool to make use of machine learning to proactively fetch the data. In this mechanism, the machine learning based engine can be trained with real time samples, which can be used to learn about the scenarios under which a given client requests the data, and then can predict the client's needs based on this information. Using the predictions, the data broker gateway can proactively fetch the data from the server ahead of time and keep the data ready for use.

These pre-fetching data mechanisms help the data broker gateway to be ready with the data ahead of time, thereby reducing the latency involved in responding to client requests. The rule based engine or machine learning based engine can be loaded/unloaded as separate libraries so that when not needed, the libraries need not be loaded, thereby reducing the memory footprint of the data broker gateway.

In one example, a maintenance user may pull out flight log data from the built-in test equipment (BITE) memory after logging into an application, so at the time the data broker gateway knows a login has occurred, the data broker gateway can start fetching the flight log data from the BITE memory. In another example, weather data may be pulled in for flight planning whenever FMS predictions get kicked in. If the data broker gateway can detect or predict when the FMS predictions might get kicked in, the data broker gateway can fetch the weather data from web applications and keep it ready.

Configuration Flexibility

The data broker gateway can be hosted as a certified application along with other certified applications, sharing the same processor and memory, or the data broker gateway can be hosted separately with a dedicated processor and memory. In addition, the data broker gateway can be certified to a desired level of safety. Alternatively, the data broker gateway can be hosted as an uncertified application.

Figure 7:
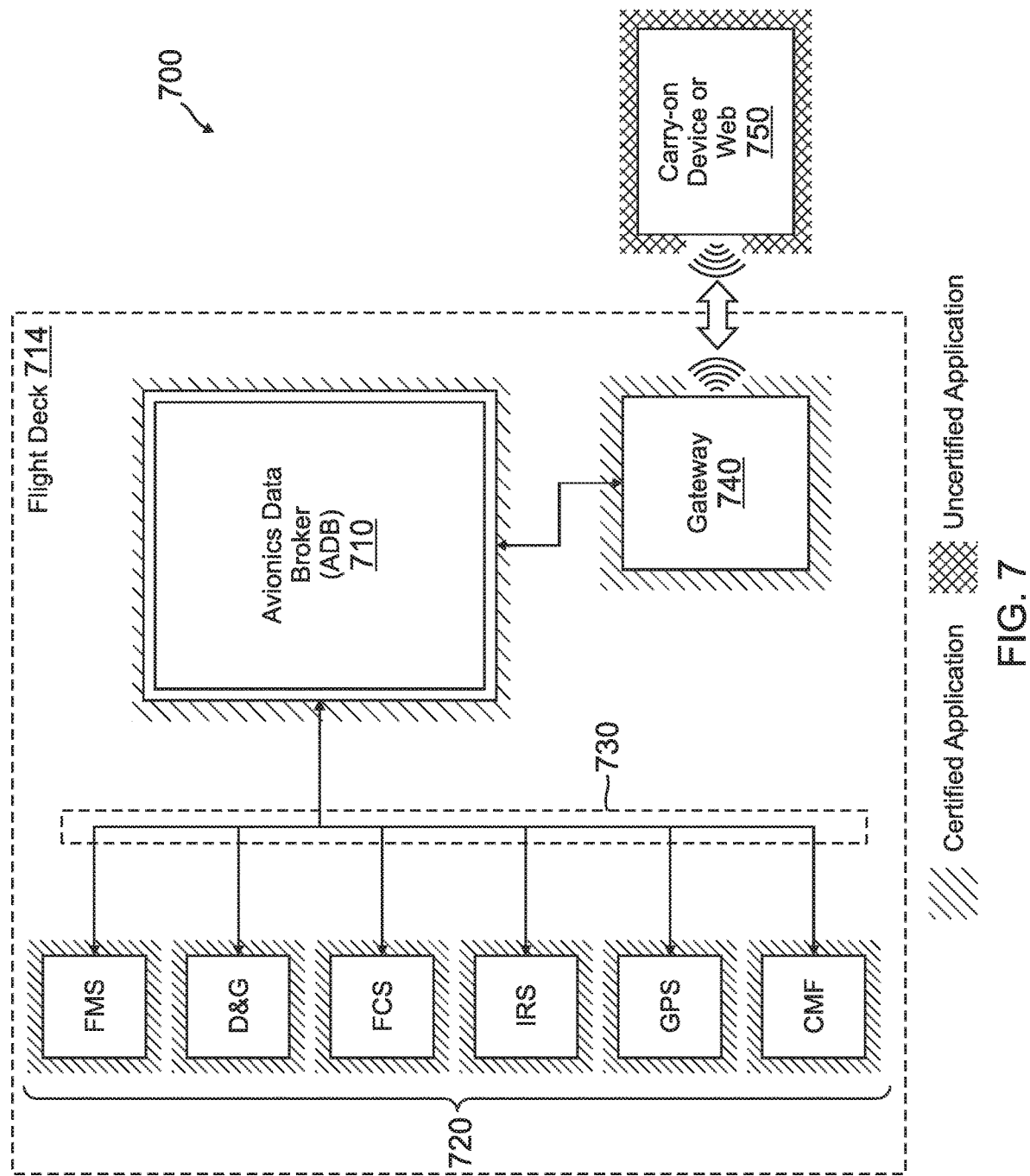
FIG. 7 is a block diagram of a system for information exchange according to an exemplary embodiment, in which an avionics data broker gateway is hosted as a certified application.

FIG. 7 illustrates a system 700 for information exchange according to an exemplary embodiment, in which an avionics data broker (ADB) gateway 710 is hosted as a certified application, such as on a flight deck 714 of an aircraft. The ADB gateway 710 is in operative communication with a plurality of certified applications, hosted in onboard avionics units 720 (e.g., FMS, D&G, FCS, II S, GPS, CMF), through an avionics data bus 730. The ADB gateway 710 is also in operative communication with an onboard certified wireless gateway 740, which provides wireless communications (e.g., Wi-Fi) with uncertified applications that reside on outside data sources/clients such carry-on mobile devices or the web 750, or with a wired EFB device hosting uncertified applications.

Figure 8:
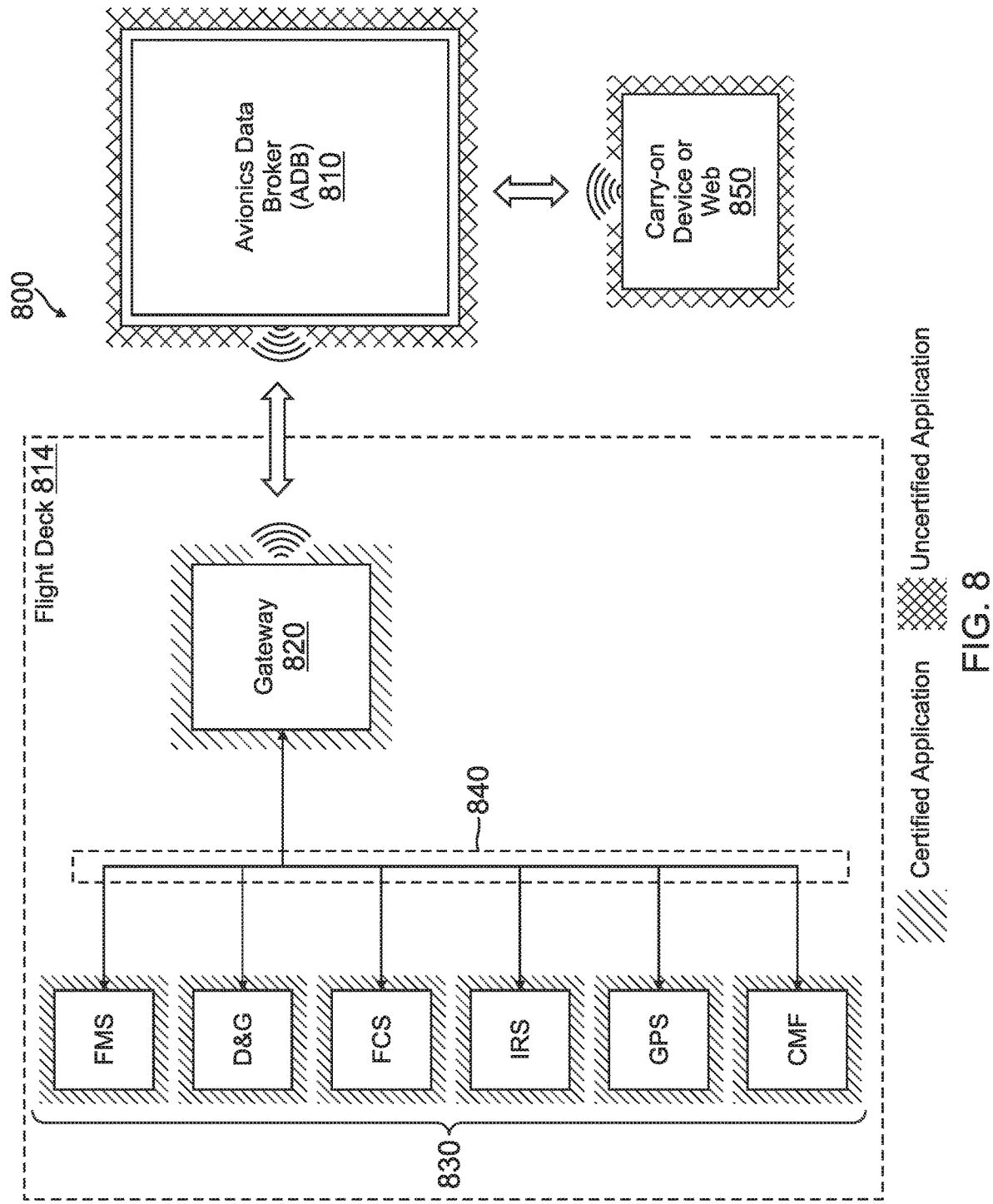
FIG. 8 is a block diagram of a system for information exchange according to another exemplary embodiment, in which an avionics data broker gateway is hosted as an uncertified application.

FIG. 8 illustrates a system 800 for information exchange, according to another exemplary embodiment, in which an avionics data broker (ADB) gateway 810 is hosted as an uncertified application, off a flight deck 814 of an aircraft. The ADB gateway 810 operatively communicates with an onboard certified wireless gateway 820, such as through wireless communications (e.g., Wi-Fi), or with an EFB device. The wireless gateway 820 or EFB device is in operative communication with a plurality of certified applications, hosted in onboard avionics units 830 (e.g., FMS, D&G, FCS, IRS, GPS, CMF), through an avionics data bus 840. The ADB gateway 810 is also in operative wireless communications (e.g., Wi-Fi) or wired communications (via an EFB device) with uncertified applications that reside on outside data sources/clients, such carry-on mobile devices or the web (850).

A computer or processor used in the present system and method can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present method can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

Example Embodiments

Example 1 includes a system for information exchange, the system comprising a vehicle electronics data broker gateway operative to exchange information between one or more vehicle electronics certified applications and one or more uncertified applications through one or more application programming interfaces, the data broker gateway comprising: one or more configuration files, which are generated with a dedicated modeling tool based on user requirements; a source selection module operative to seamlessly choose a best data source amongst a plurality of data sources based on one or more criterions; a source abstraction and data collection module operative to receive data from the data source, either based on pull from a client or push from the data source, wherein the data source comprises one of the vehicle electronics certified applications or one of the uncertified applications; a data conversion module operative to convert the data received from the data source into a standard format supported by the one or more application programming interfaces; at least one data cache operative to store the data received from the data source before transmitting the data to the client; a client abstraction and data dispatch module operative to transmit the data to the client, either based on push from the data source or pull from the client, wherein the client comprises one of the vehicle electronics certified applications or one of the uncertified applications; and a data pre-fetch module comprising a rule based engine operative to determine a time to pre-fetch data based on one or more pre-defined rules; and a machine learning based engine that is operative to learn data fetching conditions for a given data source, and then use the learning to determine a time to pre-fetch a given data from the given data source.

Example 2 includes the system of Example 1, wherein the one or more configuration files contain information comprising one or more of the following elements: identification of clients and servers; types of data to be collected and under what conditions; rate of data collection and transmission; alternate sources for a given data and order of data source selection; whether or not to predict client data needs and to proactively pre-fetch data; pre-fetch the data if needed; or ratification of data sources.

Example 3 includes the system of any of Examples 1-2, wherein the modeling tool comprises: modules containing identification of clients and servers, including one or more clients and servers for the same data; modules containing types of data to be collected and under what conditions; modules containing rate of data collection and transmission; modules containing alternate sources for a given data and order of data selection; modules regarding data needing pre-fetching, and rules for the rule based engine; module to determine a pre-fetching mode; and a module containing ratification of data sources.

Example 4 includes the system of any of Examples 1-3, wherein the vehicle electronics data broker gateway is hosted as a certified application onboard a vehicle.

Example 5 includes the system of any of Examples 1-3, wherein the vehicle electronics data broker gateway is hosted as an uncertified application.

Example 6 includes the system of any of Examples 1-5, wherein the vehicle electronics data broker gateway comprises an avionics data broker gateway operative to exchange information between one or more avionics certified applications and one or more uncertified applications.

Example 7 includes the system of Example 6, wherein the one or more avionics certified applications reside in one or more avionics line replaceable units or certified hardware modules onboard an aircraft.

Example 8 includes the system of any of Examples 6-7, wherein the one or more uncertified applications reside in one or more Internet servers, one or more weather servers, one or more mobile devices, one or more portable electronics devices, other aircraft, one or more ground centers, or one or more electronic flight bags.

Example 9 includes the system of any of Examples 6-8, wherein the avionics data broker gateway is hosted as an avionics certified application onboard an aircraft.

Example 10 includes the system of Example 9, further comprising a certified wireless gateway onboard the aircraft and in operative communication with the avionics data broker gateway, the certified wireless gateway providing wireless communications with the one or more uncertified applications.

Example 11 includes the system of any of Examples 6-8, wherein the avionics data broker gateway is hosted as an uncertified application.

Example 12 includes the system of Example 11, further comprising a certified wireless or wired gateway onboard an aircraft and in operative communication with the avionics data broker gateway.

Example 13 includes a method for information exchange between one or more vehicle electronics certified applications and one or more uncertified applications through one or more application programming interfaces operated by a vehicle electronics data broker gateway, the method comprising: generating one or more configuration files with a dedicated modeling tool based on user requirements; selecting a best data source amongst a plurality of data sources based on one or more criterions; receiving data from the data source, either based on pull from a client or push from the data source, wherein the data source comprises one of the vehicle electronics certified applications or one of the uncertified applications; converting the data received from the data source into a standard format supported by the one or more application programming interfaces; storing the data received from the data source before transmitting the data to the client; and transmitting the data to the client, either based on push from the data source or pull from the client, wherein the client comprises one of the vehicle electronics certified applications or one of the uncertified applications.

Example 14 includes the method of Example 13, further comprising determining whether there is a need for proactive data pre-fetch, and if there is a need for proactive data pre-fetch: using a rule based engine to determine a time to pre-fetch data based on one or more pre-defined rules; or using a machine learning based engine to learn data fetching conditions for a given data source, and then use the learning to determine a time to pre-fetch a given data from the given data source.

Example 15 includes the method of any of Examples 13-14, wherein the one or more configuration files are generated to contain information comprising one or more of the following elements: identification of clients and servers; types of data to be collected and under what conditions; rate of data collection and transmission; alternate sources for a given data and order of data selection; whether or not to predict client data needs and to proactively pre-fetch data; pre-fetch the data if needed; or ratification of data sources.

Example 16 includes the method of any of Examples 13-15, wherein the vehicle electronics data broker gateway is hosted as a certified application onboard a vehicle.

Example 17 includes the method of any of Examples 13-15, wherein the vehicle electronics data broker gateway is hosted as an uncertified application.

Example 18 includes the method of any of Examples 13-17, wherein the vehicle electronics data broker gateway comprises an avionics data broker gateway operative to exchange information between one or more avionics certified applications and one or more uncertified applications.

Example 19 includes the method of Example 18, wherein the avionics data broker gateway is hosted as an avionics certified application onboard an aircraft.

Example 20 includes the method of Example 18, wherein the avionics data broker gateway is hosted as an uncertified application.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method comprising:
    receiving, by one or more processors at a vehicle electronics data broker gateway, a request from a client to exchange data between one or more vehicle electronics certified applications and one or more uncertified applications through one or more application programming interfaces;
    selecting, by the one or more processors, a preferred data source from a plurality of redundant data sources for the data based on one or more criterions defined in one or more configuration files, wherein the selected data source includes one of the one or more vehicle electronics certified applications or one of the one or more uncertified applications, wherein the selecting the preferred data source includes:
    determining, by the one or more processors, whether the preferred data source is available;
    in accordance with a determination that the preferred data source is not available, selecting, by the one or more processors, a next preferred data source from the plurality of redundant data sources for the data based on the one or more configuration files;
    in accordance with a determination that the preferred data source is available, determining, by the one or more processors, whether the data from the preferred data source is valid; and
    in accordance with a determination that the data from the preferred data source is valid, selecting, by the one or more processors, the preferred data source for the data;
    receiving, by the one or more processors, the data from the selected data source;
    converting, by the one or more processors, the data received from the selected data source into a standard format supported by the one or more application programming interfaces;

storing, by the one or more processors, the converted data received from the selected data source before transmitting the converted data to the client; and transmitting, by the one or more processors, the stored data to the client, wherein the client includes the other of the one or more vehicle electronics certified applications or the one or more uncertified applications.

2. The method of claim 1, wherein the receiving the request from the client includes:

pre-fetching, by the one or more processors, the data, using a rule based engine to determine a time to pre-fetch the data based on one or more pre-defined rules; or pre-fetching, by the one or more processors, the data using a machine learning based engine to learn data fetching conditions for the selected data source to determine a time to pre-fetch the data from the selected data source.

3. The method of claim 1, further including:

configuring, by the one or more processors, the vehicle electronics data broker gateway based on the one or more configuration files, wherein the one or more configuration files include information defining at least one of:

identities of clients and servers;
types of data to be collected and under what conditions;
rate of data collection and transmission;
alternate sources of the plurality of redundant data sources for the data and order of data source selection;
whether or not to predict client data needs and to proactively pre-fetch the data; or
ratification of data sources.

4. The method of claim 1, wherein the vehicle electronics data broker gateway is hosted as a certified application onboard a vehicle.

5. The method of claim 1, wherein the vehicle electronics data broker gateway is hosted as an uncertified application.

6. A system, comprising:

a memory, the memory storing processor-readable instructions; and one or more processors configured to execute the processor-readable instructions, that when executed configures the one or more processors to perform a method including:

receiving, by a vehicle electronics data broker gateway, a request from a client to exchange data between one or more vehicle electronics certified applications and one or more uncertified application through one or more application programming interfaces;

selecting, by the vehicle electronics data broker gateway, a preferred data source from a plurality of redundant data sources for the data based on one or more criterions defined in one or more configuration files, wherein the selected data source includes one of the one or more vehicle electronics certified applications or one of the one or more uncertified applications, wherein the selecting the preferred data source includes:

determining, by the vehicle electronics data broker gateway, whether the preferred data source is available;

in accordance with a determination that the preferred data source is not available, selecting a next preferred data source from the plurality of redundant data sources for the data based on the one or more configuration files;

in accordance with a determination that the preferred data source is available, determining, by the vehicle electronics data broker gateway, whether the data from the preferred data source is valid; and in accordance with a determination that the data from the preferred data source is valid, selecting the preferred data source for the data;

receiving, by the vehicle electronics data broker gateway, the data from the selected data source;

converting, by the vehicle electronics data broker gateway, the data received from the selected data source into a standard format supported by the one or more application programming interfaces;

storing, by the vehicle electronics data broker gateway, the converted data received from the data source before transmitting the converted data to the client; and transmitting, by the vehicle electronics data broker gateway, the stored data to the client, wherein the client includes the other of the one or more vehicle electronics certified applications or the one or more uncertified applications.

7. The system of claim 6, wherein the receiving, by the vehicle electronics data broker gateway, the request from the client includes:

pre-fetching, by the vehicle electronics data broker gateway, the data using a rule based engine to determine a time to pre-fetch the data based on one or more pre-defined rules; or pre-fetching, by the vehicle electronics data broker gateway, the data using a machine learning based engine to learn data fetching conditions for the selected data source to determine a time to pre-fetch the data.

8. The system of claim 7, wherein the pre-fetching, by the vehicle electronics data broker gateway, the data includes:

pre-fetching, by the electronics data broker gateway, the data based on a need of the client for use of the data.

9. The system of claim 6, wherein the method further includes:

configuring the vehicle electronics data broker gateway based on the one or more configuration files, wherein the configuration files include information defining at least one of:

identities of clients and servers;
types of data to be collected and under what conditions;
rate of data collection and transmission;
alternate data sources of the plurality of redundant data sources for the data and order of data selection;
whether or not to predict client data needs and to proactively pre-fetch the data; or
ratification of data sources.

10. The system of claim 6, wherein the vehicle electronics data broker gateway is hosted as a certified application onboard a vehicle.

11. The system of claim 6, wherein the vehicle electronics data broker gateway is hosted as an uncertified application.

12. The system of claim 6, wherein the one or more certified applications reside in one or more avionics line replaceable units or certified hardware modules onboard an aircraft.

13. The system of claim 12, wherein the one or more uncertified applications reside in one or more Internet servers, one or more weather servers, one or more mobile devices, one or more portable electronics devices, other aircraft, one or more ground centers, or one or more electronic flight bags.

14. The method of claim 2, wherein the pre-fetching the data includes:

pre-fetching, by the one or more processors, the data based on a need of the client for use of the data.

15. The method of claim 1, wherein the one or more certified applications reside in one or more avionics line replaceable units or certified hardware modules onboard an aircraft.

16. The method of claim 1, wherein the one or more uncertified applications reside in one or more Internet servers, one or more weather servers, one or more mobile devices, one or more portable electronics devices, other aircraft, one or more ground centers, or one or more electronic flight bags.

17. A computer-readable medium containing instructions for execution by one or more processors, that when executed by the one or more processors, cause the one or more processors to perform a method including:

receiving, by a vehicle electronics data broker gateway, a request from a client to exchange data between one or more vehicle electronics certified applications and one or more uncertified application through one or more application programming interfaces;

selecting, by the vehicle electronics data broker gateway, a preferred data source from a plurality of redundant data sources for the data based on one or more criterions defined in one or more configuration files, wherein the selected data source includes one of the one or more vehicle electronics certified applications or one of the one or more uncertified applications, wherein the selecting the preferred data source includes:

determining, by the vehicle electronics data broker gateway, whether the preferred data source is available;

in accordance with a determination that the preferred data source is not available, selecting a next preferred data source from the plurality of redundant data sources for the data based on the one or more configuration files;

in accordance with a determination that the preferred data source is available, determining, by the vehicle electronics data broker gateway, whether the data from the preferred data source is valid; and in accordance with a determination that the data from the preferred data source is valid, selecting the preferred data source for the data;

receiving, by the vehicle electronics data broker gateway, the data from the selected data source;

converting, by the vehicle electronics data broker gateway, the data received from the selected data source into a standard format supported by the one or more application programming interfaces;

storing, by the vehicle electronics data broker gateway, the converted data received from the data source before transmitting the converted data to the client; and transmitting, by the vehicle electronics data broker gateway, the stored data to the client, wherein the client includes the other of the one or more vehicle electronics certified applications or the one or more uncertified applications.

* * * * *